United States Patent
Habel et al.

[11] Patent Number: 5,614,108
[45] Date of Patent: Mar. 25, 1997

[54] METHOD AND APPARATUS FOR FAST HOLE ELECTRICAL DISCHARGE MACHINING

[75] Inventors: Michael J. Habel, Ann Arbor; Larry A. Peterson, Grosseile, both of Mich.

[73] Assignee: Ford Motor Company, Dearborn, Mich.

[21] Appl. No.: 568,711

[22] Filed: Dec. 7, 1995

[51] Int. Cl.$^6$ .................................................. B23H 1/04
[52] U.S. Cl. .................................. 219/69.15; 219/69.17
[58] Field of Search ........................ 219/69.15, 69.14, 219/69.17; 205/653, 665, 686

[56] References Cited

U.S. PATENT DOCUMENTS

| | | | |
|---|---|---|---|
| 2,818,490 | 12/1957 | Dixon et al. | 219/69.15 |
| 3,352,770 | 11/1967 | Crawford et al. | 205/665 |
| 3,622,734 | 11/1971 | Mainwaring | 219/69.15 |
| 3,622,735 | 11/1971 | Mainwaring | 219/69.15 |
| 4,096,371 | 6/1978 | Lozon | 219/69.15 |
| 4,544,139 | 10/1985 | Moore et al. | 266/48 |
| 4,628,171 | 12/1986 | Colby et al. | 219/69.16 |
| 4,654,498 | 3/1987 | Sato | 219/69.15 |
| 4,654,499 | 3/1987 | Houman et al. | 219/69.16 |
| 4,721,838 | 1/1988 | Abdukarimov et al. | 219/69.15 |
| 4,766,280 | 8/1988 | Groos | 219/69.16 |
| 4,797,527 | 1/1989 | Yamamoto et al. | 219/69.15 |
| 4,855,557 | 8/1989 | Denny | 219/69.15 |
| 5,059,289 | 10/1991 | Gaskell | 205/665 |
| 5,091,622 | 2/1992 | Ohba | 219/69.15 |
| 5,514,845 | 5/1996 | Ezaki et al. | 219/69.15 |

FOREIGN PATENT DOCUMENTS 59-214519 12/1984 Japan .................................. 219/69.14

*Primary Examiner*—Geoffrey S. Evans
*Attorney, Agent, or Firm*—Roger L. May; Joseph W. Malleck

[57] ABSTRACT

A fast hole drilling EDM electrode and a more efficient apparatus and method for electrical discharge machining using the electrode. The electrode has an electrically conductive body with a leading end or tip and a length of relatively uniform non-circular cross-section that is operatively adapted to provide a dielectric flush path between the electrode body and the hole being machined in the workpiece. At least one dielectric supply bore is formed lengthwise through the body. The one or more supply bores connect a dielectric exit at the leading end of the body with a dielectric entrance located distally therefrom. This electrode is operatively adapted for being rotated during the machining process and for its non-circular cross-section to form a hole with a circular cross-section, when so rotated. During machining, a suitable dielectric fluid is supplied to the dielectric entrance of the electrode under sufficient pressure to force the dielectric through the one or more supply bores and out the dielectric exit to flush the eroded material through the dielectric flush path and out of the hole being drilled. With the present invention, a hole in a workpiece can be machined at faster rates, while still maintaining the surface quality and dimensional precision expected from an EDM apparatus and method.

15 Claims, 3 Drawing Sheets

METHOD AND APPARATUS FOR FAST HOLE ELECTRICAL DISCHARGE MACHINING

FIELD OF THE INVENTION

The present invention is related to electrical discharge machining, more particularly, to a method and apparatus for electrical discharge machining a hole in a workpiece and, even more particularly, to a fast hole drilling electrode for electrical discharge machining.

BACKGROUND OF THE INVENTION

In the electrical discharge machining of a workpiece, electricity is typically conducted from the workpiece, through a dielectric fluid and to an electrode, in order to erode away material from the workpiece. Electrical discharge machining (EDM) is desired for the finished quality of the machined surfaces it produces and the high degree of precision made possible with this technique. However, depending on the amount of material being machined, and therefore removed, electrical discharge machining can take an undesirable length of time to complete an operation, such as drilling a hole. Such slow removal rates have limited the cost effectiveness of using EDM techniques in high volume manufacturing applications, especially where relatively large portions of a workpiece are being removed. In order to make electrical discharge machining techniques more cost effective, changes need to be made that will increase the machining rates attainable and improve the overall efficiency of the process, while still maintaining the surface quality and dimensional precision expected from an EDM process.

Therefore, there is a need for a more efficient electrical discharge machining apparatus and method capable of machining holes at faster rates than heretofore possible while maintaining high quality finished surfaces and a high degree of precision in the holes being machined.

SUMMARY OF THE INVENTION

The present invention satisfies these needs by providing a hole drilling EDM electrode and by providing a more efficient apparatus and method for electrical discharge machining with the present electrode. With the present invention, a hole in a workpiece can be drilled at faster rates by electrical discharge machining, while still maintaining the surface quality and dimensional precision expected from an EDM apparatus and method.

In one aspect of the present invention, an improved electrode is provided for electrical discharge machining a circular hole in a workpiece. The present electrode has an electrically conductive body with a leading end or tip and a length of relatively uniform non-circular cross-section. At least one dielectric supply bore is formed lengthwise through the body. The one or more supply bores connect a dielectric exit, of one or more openings, at the leading end of the body with a dielectric entrance, of one or more openings, located distally from the leading end. This electrode is operatively adapted for being rotated during the machining process and for its non-circular cross-section to form a hole with a circular cross-section, when so rotated. During machining, a suitable dielectric fluid is supplied to the dielectric entrance of the electrode under sufficient pressure to force the dielectric through the one or more supply bores and out the dielectric exit to fill the gap between the electrode and the workpiece. As it passes up through this gap and out the hole being drilled, the dielectric fluid flushes eroded workpiece material out of the hole.

Conventional hole drilling EDM electrodes which are rotated during machining have a circular cross-section, and those that are not rotated have a circular or a non-circular cross-section. In either case, the clearance or machining gap between a conventional EDM electrode and the side wall of the hole being machined is typically on the order of only a few thousandths of an inch. Such a narrow gap is usually necessary in order to maintain the desired machining parameters and thereby optimize the EDM process. Dielectric fluid and machining effluent (i.e., particles of workpiece material) being flushed out of the hole during machining must exit through this narrow gap. It has been found that the rate at which the dielectric fluid and machining effluent is removed from the hole directly impacts the rate at which the hole is formed. It is believed that the machining rate can be adversely affected (i.e., slowed down) by the size of this gap, such as when the gap restricts the flow of eroded workpiece material out of the hole. It is also believed the machining process is slowed down by large particles of eroded workpiece material being lodged in the narrow gap or otherwise causing an electrical short between the electrode and the workpiece. When the it shorts out, the electrode backs out of the hole or at least slows down until the large particle is further eroded and flushed out of the hole.

The present rotated electrode solves this problem by having a non-circular cross-section that is operatively adapted to provide a dielectric flush path between the electrode body and the hole being machined in the workpiece. That is, because of its non-circular cross-section, the present rotated electrode provides a larger area for the particles of eroded workpiece material to pass through on their way out the hole being drilled. At the same time, the non-circular cross-section of the electrode body is adapted to include at least one portion which remains in close proximity to the side wall of the hole, as the electrode is rotated, in order to maintain a desired machining gap during the EDM process.

It is desirable for the non-circular cross-section of the electrode body to be operatively adapted to provide a substantial increase in flush path cross-sectional area between the electrode body and the hole being machined in the workpiece. For example, the non-circular circular cross-section of the electrode body can be rectangular (including a square), triangular, elliptical or fluted in shape. The non-circular cross-section of the fluted electrode body may include one or more flutes. Each flute can, for example, spiral around the electrode body (e.g., in a manner similar to that used for mechanical drill bits) or run longitudinally along the electrode body in a straight, zig-zag or curved line. It is desirable for the fluted shape of such an electrode body to be operatively adapted (e.g., like that of a conventional fluted or spiral drill bit) to increase the rate at which dielectric fluid and machining effluent flows through the flush path and out the hole being machined, while the electrode is rotated.

The efficiency of an electrical discharge machining process can be compromised by power losses. A major contributor to such losses is the leakage of current through the dielectric fluid between the electrode and the side wall of the hole being machined in the workpiece. The amount of power lost is directly proportional to the amount of overlapping surface area between the electrode and the workpiece. Thus, such power losses and the associated drop in machining efficiency become more acute the deeper the hole being drilled (i.e., during deep hole EDM drilling). In order to reduce power losses due to such current leakage, the electrode body can be coated with a layer of electrically insulative material at locations and to a thickness sufficient to substantially limit, if not completely prevent, current leakage therethrough. It is desirable for such a layer of electrically insulative material (i.e., the insulation layer) to be coated onto any surface of the electrode body from which current could leak and which is not needed for machining. By reducing the amount of leakage current, such an insulation layer enables the power available at the leading or machining end of the electrode to be increased. The electrical insulation layer can be made of any suitable electrically insulative material. For example, a polyamide or other suitable polymer material may be used.

In one embodiment of such an insulated electrode, the electrode body has an interior surface forming one dielectric supply bore, an exterior surface and an insulation layer of electrically insulative material coated on the interior and exterior surfaces. It is desirable for the one dielectric supply bore used in this electrode embodiment to be formed through the center, along the longitudinal axis, of the electrode body. Because substantially all, if not all, of the electrical discharge machining occurs there, the leading end of the electrode body is substantially free of an electrically insulative material.

The use of such an insulation layer not only improves machining efficiency (i.e., the rate of machining) but, because the likelihood of side wall electrical discharge and current bleed-off is substantially reduced, if not eliminated, the insulation layer also enables deeper holes to be drilled by an EDM process. For those electrodes having one or more dielectric supply bores which do not form a core of workpiece material during the EDM operation, the interior surface forming the one or more dielectric supply bores need not be coated with an insulation layer. It is still desirable for the exterior surface of the electrode body to be so coated.

Basically, the speed at which a hole can be drilled using electrical discharge machining is proportional to how much workpiece material has to be removed by the EDM process. Depending on the diameter of the centrally located dielectric supply bore, a core can be formed from the workpiece material that is not machined (i.e., that is aligned with the dielectric supply bore). Especially in the forming of through holes, it is desirable for the inside diameter and the outside diameter of such an insulated electrode body to be at a ratio that maximizes the diameter of the core being formed. In this way, because the amount of workpiece material being removed is reduced, the hole can be machined faster.

During electrical discharge machining, the electrode, as well as the workpiece, is electrically eroded away. The rate at which the electrode erodes can be reduced but electrode erosion cannot be completely eliminated. However, another benefit of coating the electrode body up to its leading end, with a layer of electrically insulative material, is the minimizing of electrode erosion. Once an EDM electrode experiences significant erosion (i.e., the electrode is unable to maintain the desired dimensional tolerances for the hole being machined), the electrode has to be replaced. Thus, coating the electrode body with a layer of electrically insulative material, as described above, can provide the added benefit of increasing the useful life of the electrode.

In another aspect of the present invention, an apparatus is provided for electrical discharge machining a circular hole in a workpiece. The apparatus includes an electrical discharge machine and a rotatable electrode. The electrical discharge machine is operatively adapted for mounting and rotating the electrode, for supplying dielectric fluid to the dielectric entrance of the electrode body, and also for conducting an electrical current through the dielectric fluid between the workpiece and the electrode.

In an additional aspect of the present invention, a method is provided for electrical discharge machining a circular hole in a workpiece. The method comprises the steps of providing a rotatable electrode, as described above; rotating the electrode; supplying a dielectric fluid through the at least one dielectric supply bore of the electrode, out the leading end of the electrode and between the conductive body of the electrode and the workpiece; and disposing the electrode and workpiece proximal to each other, while maintaining a prescribed distance therebetween. The present method can be used to machine a blind hole or a through hole in the workpiece.

In a further aspect of the present invention, an alternative electrode is provided for electrical discharge machining a hole in a workpiece. This electrode includes an electrically conductive body having a leading end, a length of relatively uniform cross-section with at least one dielectric supply bore formed lengthwise through the body. The at least one bore connects a dielectric exit at the leading end of the electrode body, and a dielectric entrance is located distally therefrom. The electrode body has at least one interior surface forming the at least one dielectric supply bore and an exterior surface. A layer of electrically insulative material coats the at least one interior surface and the exterior surface of the electrode body, and the leading end of the electrode body is substantially free of an electrically insulative material. This electrode can be rotated or not rotated during the machining process. In addition, the cross-section of the electrode body can be circular or any other suitable cross-section.

The objectives, features, and advantages of the present invention will become apparent upon consideration of the specification and the appended drawings.

DETAILED DESCRIPTION OF THE INVENTION

Figure 1:
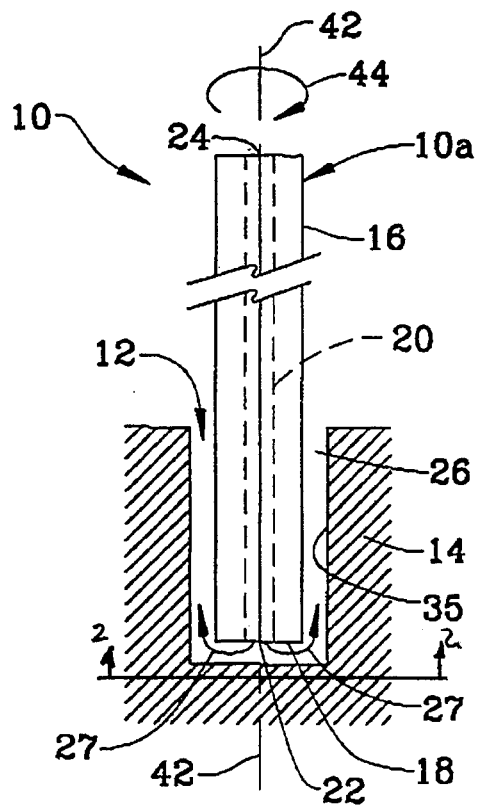
FIG. 1 is a partially sectioned side view of one embodiment of a rotated EDM electrode, according to the present invention, with a triangular cross-section.
Figure 3:
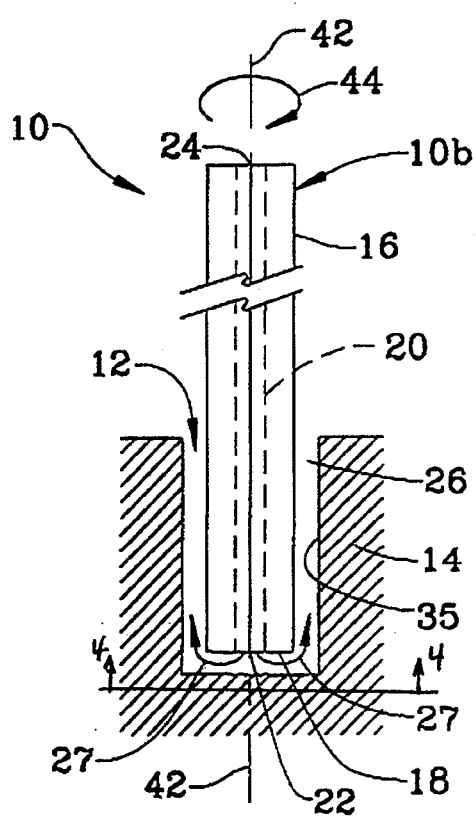
FIG. 3 is a partially sectioned side view of another embodiment of a rotated EDM electrode, according to the present invention, with a rectangular cross-section.

Referring to FIGS. 1–8, one type of electrical discharge machining (EDM) electrode 10 for rapidly drilling a hole 12 in a workpiece 14 includes an electrically conductive body 16 with a leading end or tip 18 and a length of relatively uniform non-circular cross-section. At least one dielectric supply bore 20 is formed lengthwise through the body 16. One or more supply bores 20 connect a dielectric exit, of one or more openings 22, at the leading end 18 of the body 16 with a dielectric entrance, of one or more openings 24, located distally from the leading end 18. During machining, a suitable dielectric fluid is supplied to the one or more dielectric entrance openings 24 under sufficient pressure to force the dielectric fluid through the at least one supply bore 20 and out the one or more dielectric exit openings 22 to fill a gap 26 formed between the electrode 10 and the workpiece 14. As it passes up through this gap 26 and out the hole 12 being drilled, the dielectric fluid flushes machining effluent, such as eroded workpiece material, out of the hole 12. The flow direction of the dielectric fluid is indicated by arrows 27. The size of each gap 27 shown in the FIGS. 1–9 is exaggerated for ease of illustration.

Figure 7:
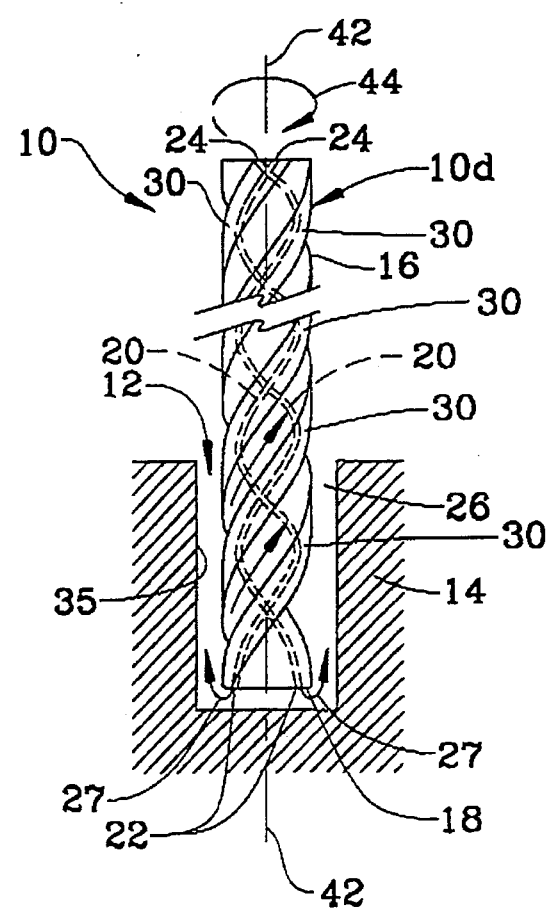
FIG. 7 is a partially sectioned side view of a further embodiment of a rotated EDM electrode, according to the present invention, with a fluted cross-section.
Figure 8:
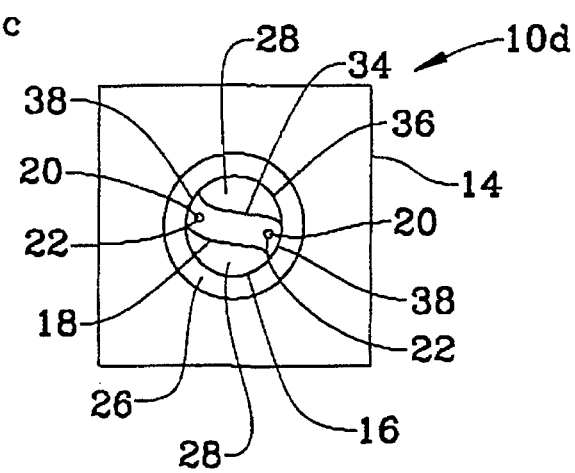
FIG. 8 is an end view taken along lines 8—8 of FIG. 7.

The non-circular cross-section of the rotated EDM electrode 10 is operatively adapted to provide a dielectric flush path 28 between the electrode body 16 and the hole 12 being machined in the workpiece 14. That is, because of its non-circular cross-section, the present rotated electrode provides a larger area for particles of eroded workpiece material to pass through on their way up and out of the hole 12 being drilled. It is desirable for the non-circular cross-section of the electrode body 16 to be operatively adapted to provide a substantial increase in flush path cross-sectional area between the electrode body 16 and the workpiece 14. Such a flush path 28 can be obtained, for example, by making the non-circular cross-section of the electrode body 16 triangular, rectangular, elliptical or fluted in shape (see FIGS. 2, 4, 6 and 8, respectively). The exemplary embodiments of the electrode 10 shown in FIGS. 1–8 will hereafter be indicated by the reference numbers 10a–10d, respectively. The non-circular cross-section of the body 16 of fluted electrode 10d may include one flute 30 or a plurality of flutes 30, as shown in FIGS. 7 and 8. The body 16 of fluted electrode 10d may also have two off-center supply bores 20, as shown, or a single central supply bore 20, as found in the other electrodes 10a–10c.

The non-circular cross-section of the electrode body 16, of each of the electrodes 10a–10d, is adapted to include at least one portion 38 which remains the desired machining gap 26 from the side wall 35 of the circular hole 12, as the electrode body 16 rotates around its central axis 42 (indicated by the arrow 44) during the electrical discharge machining process. For the electrodes 10a–10c shown in FIGS. 1–6, a phantom circular line 32 indicates the path followed by the corresponding portions 38 of each electrode 10a–10c. Thus, the desired machining gap 26 for the electrodes 10a–10c is defined by the space between the circular phantom line 32 and the side wall 35 of the hole 12. For the fluted electrode 10d shown in FIGS. 7 and 8, a solid circular line 36 indicates the path followed by the portions 38 of the electrode 10d. Thus, the desired machining gap 26 for the fluted electrode 10d is defined by the circular line 36 and the side wall 35 of the hole 12.

Figure 2:
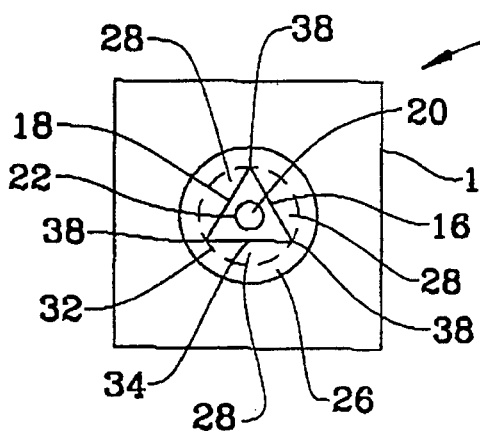
FIG. 2 is an end view taken along lines 2—2 of FIG. 1.
Figure 4:
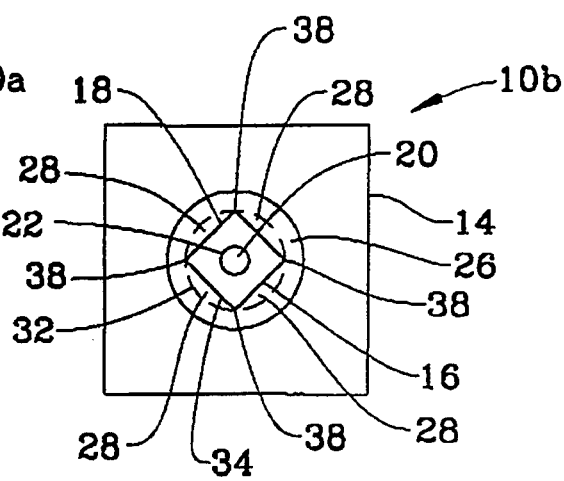
FIG. 4 is an end view taken along lines 4—4 of FIG. 3.
Figure 5:
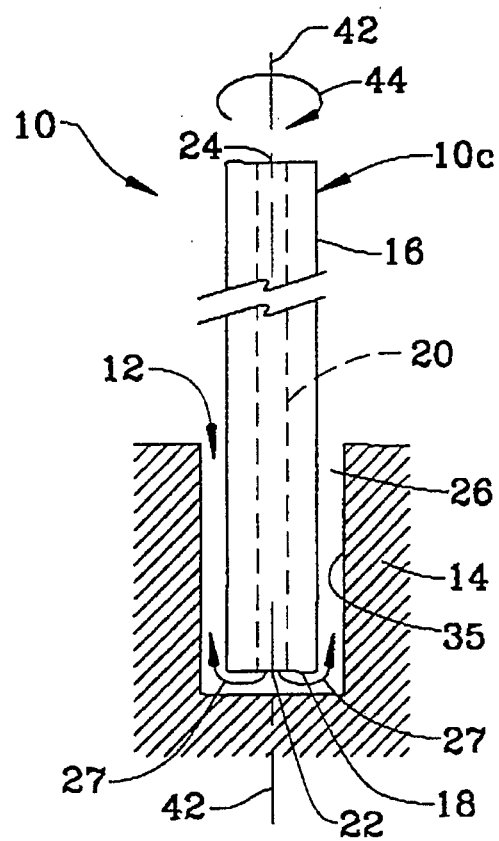
FIG. 5 is a partially sectioned side view of an additional embodiment of a rotated EDM electrode, according to the present invention, with an elliptical cross-section.
Figure 6:
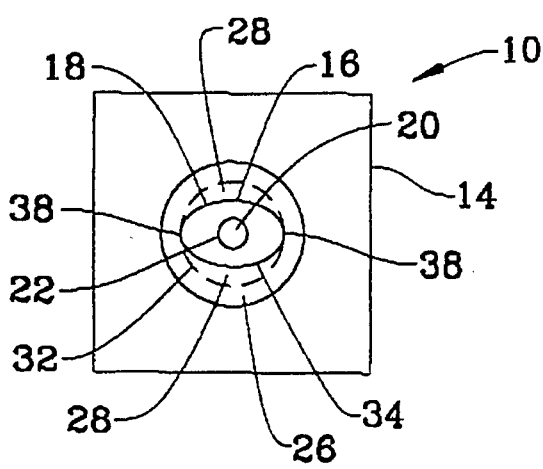
FIG. 6 is an end view taken along lines 6—6 of FIG. 5.

For electrodes 10a–10c shown in FIGS. 2, 4 and 6, the dielectric flush path 28 is defined by the space between the exterior surface 34 of the electrode body 16 and the circular phantom line 32. For the electrode 10d (see FIG. 8), the dielectric flush path 28 is defined by the space between the exterior surface 34 of the electrode body 16 forming the flutes 30 and the solid circular line 36.

Each flute 30 can, for example, run longitudinally along the electrode body 16 in a straight line, zig-zag line, curved line or a combination of two or more such lines. It is more desirable, though, for each flute 30 of the fluted electrode 10d to spiral around the electrode body 16 in a manner (as shown in FIGS. 7 and 8) similar to that used for mechanical-type spiral drill bits. The dielectric fluid flows up through the channels (i.e., dielectric flush path 28) formed between the flutes 30 on its way out the hole 12. Spiralling flutes 30 increase the rate at which dielectric fluid, and therefore machining effluent, flows through the flush path 28 while the electrode 10d is rotated.

Figure 9:
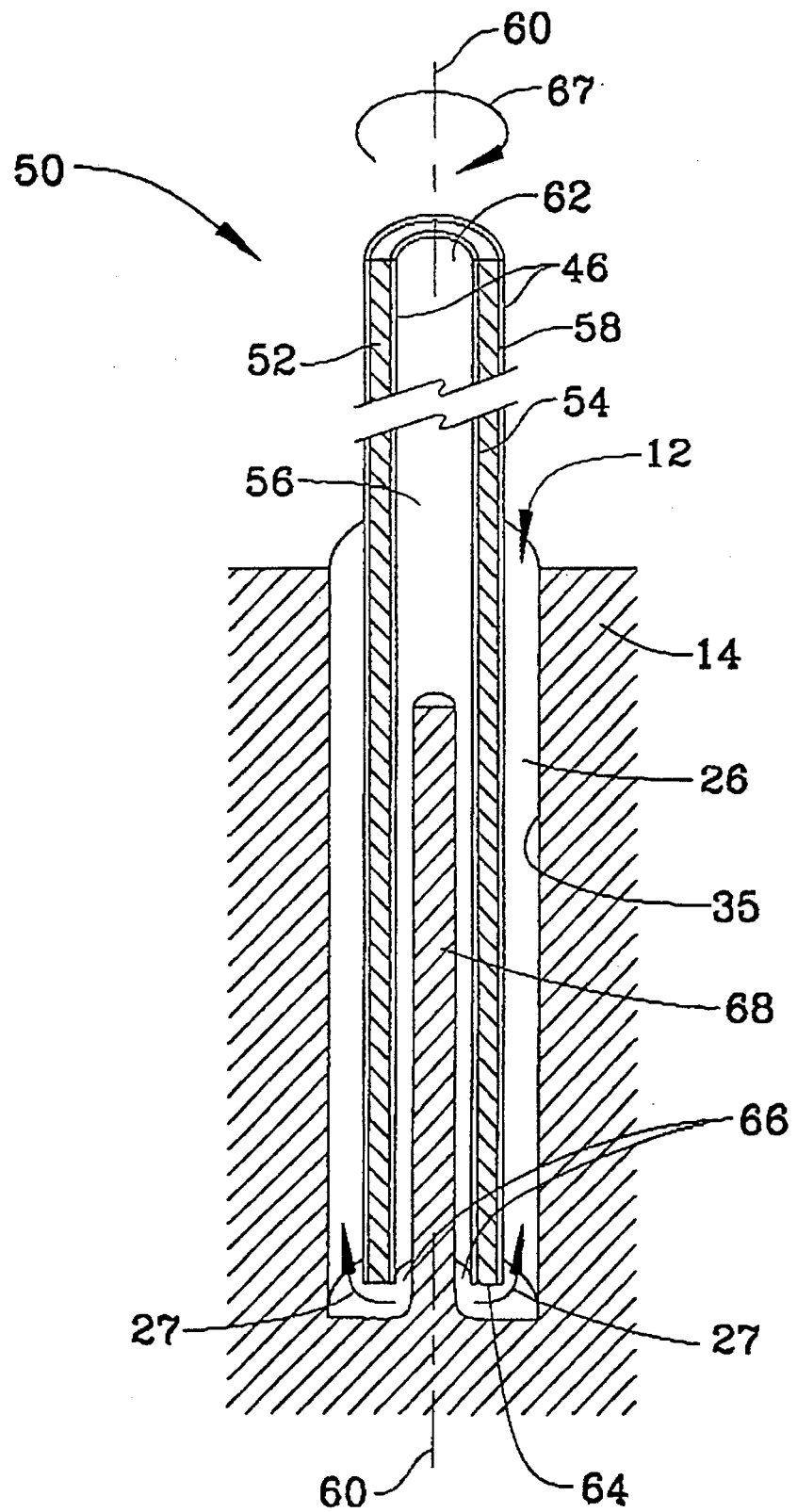
FIG. 9 is a sectioned perspective view of a rotated EDM electrode with a coating of electrically insulative material, according to the present invention.

In order to reduce power losses due to the leakage of current through the dielectric fluid between the electrode 10 and the side wall 35 of the hole 12 being machined, it is desirable to coat the electrode body 16 with one or more layers 46 of electrically insulative material at locations and to a thickness sufficient to substantially limit, if not completely prevent, current leakage therethrough (see FIG. 9). The insulative material chosen must also be able to survive the environment generated during the electrical discharge machining process at the leading end of the electrode. It is believed that suitable insulative materials for coating the present electrodes may include those disclosed in U.S. Pat. No. 4,797,527, which is incorporated herein by reference in its entirety, or even some electrically insulative polymers, such as a polyamide polymer. It is desirable for the insulation layer 46 to be coated onto any surface of the electrode body 16 from which it is not desirable for current to leak to the workpiece 14. Any surface needed for machining, like tip 18, should not be coated. By reducing the amount of leakage current, the insulation layer 46 enables the power available at the leading or machining end 18 of the electrode 10 to be increased and improves the efficiency of the EDM process. Using a coating 46 of electrically insulative material, as described above, can improve the efficiency of the EDM process regardless of whether the electrode 10 is rotated during the process or not.

Referring to FIG. 9, one example of another type of rapid drilling EDM electrode 50, according to the present invention, includes an electrode body 52 having an interior surface 54 forming one dielectric supply bore 56 and an exterior surface 58. The supply bore 56 is formed through the body 52 along its central axis 60 and connects a dielectric entrance opening, at the leading end 64 of body 52, with a dielectric exit opening 66 formed distally therefrom. This electrode 50 illustrates how the rate of machining, and therefore the efficiency of the EDM process, can be increased with a conventional tubular electrode design (i.e., having a circular cross-section) by applying one or more insulation layers 46 to the electrode body 52 so as to protect against undesirable current leakage. The leading end 64 of the electrode body 52 is free of the insulation layer 46 so that the electrical discharge machining can occur at the leading end 64.

It is desirable for the electrode 50 to be rotated about its central axis 60 (indicated by the arrow 67) during the EDM process. However, using a coating 46 of electrically insulative material, as described above, can improve the efficiency of the EDM process regardless of whether the electrode 50 is rotated during the process or not.

If warranted by the size of the hole 12 being machined, the diameter of the supply bore 56 is of a size to form a core 68 of workpiece material in line with the supply bore 56, as the hole 12 is machined. The hole 12 can be machined faster as the amount of workpiece material being removed is reduced. Thus, it is desirable for the inside diameter and the outside diameter of the insulated electrode body 52 to be at a ratio that maximizes the diameter of the core 68 being formed.

Maintaining such a ratio is particularly applicable in the forming of through holes, where the core 68 is removed from the balance of the workpiece as part of the machining process. When such a core 68 is formed, it is desirable for both the interior surface 54 and the exterior surface 58 of the body 52 to be coated with the insulation layer 46 to prevent undesirable current leakage between the electrode 50 and the core 68 as well as the side wall 35 of the hole 12.

For the type of electrode 10 having one central bore 20 adapted to form a core of workpiece material, deeper holes 12 can be drilled and drilled faster by both maximizing the inside to outside diameter ratio, to form the biggest core possible, and coating the appropriate exterior and interior surfaces of the electrode body 16 with the insulation layer 46, to prevent undesirable current leakage. Even for an electrode 10 having one or more supply bores 20 which do not form a core of workpiece material during the EDM operation, it is still desirable for the exterior surface 34 of the electrode body 16 to be coated with an insulation layer 46 to prevent undesirable current leakage from the exterior surface 34. Thus, it can be advantageous to combine the non-circular cross-section feature of the electrodes 10 with the insulation layer feature and/or inside to outside diameter ratio feature of the electrode 50 in order to form a faster hole drilling EDM electrode and produce a more efficient EDM process.

The electrodes 10 and 50 can be made using well known EDM electrode manufacturing techniques and materials. Suitable EDM electrode materials may include brass, copper, silver-tungsten, graphite, aluminum, molybdenum, tungsten, mild steel, zinc alloy, and the like. The fluted electrode 10d can be made by drilling supply bores through the length of a straight bar having a rectangular cross-section, twisting the bar around its longitudinal axis to form the flutes 30 and machining selected surfaces to desired dimensions. The resulting supply bores 20 end up being twisted, along with the bar. To test the acceptability of such a fluted electrode 10d, a fluted mechanical twist drill bit, made of high speed steel, was used for electrode 10d. The drill bit was manufactured, as described above, with two spiraling coolant supply bores. The coolant supply bores were originally intended to direct cooling fluid to the cutting edges of the mechanical drill bit. The leading end of the twist drill bit was modified for use as an EDM electrode by being machined flat, so as to be perpendicular to its longitudinal axis (i.e., the pointed tip of the mechanical drill bit was machined flat).

One embodiment of an apparatus for electrical discharge machining a circular hole in a workpiece, according to the present invention, includes a suitable electrical discharge machine and a rotatable electrode, such as electrode 10 or 50 described above. The electrical discharge machine is operatively adapted for mounting and rotating the electrode, for supplying pressurized dielectric fluid to the dielectric entrance of the electrode body and also for conducting an electrical current through the dielectric fluid between the workpiece and the electrode. An example of one such electrical discharge machine, suitable for mounting and rotating any of the above described electrodes 10 and 50, is disclosed in U.S. Pat. No. 5,391,850, which is assigned to the assignee of this application and incorporated herein by reference in its entirety.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A rotated electrode for electrical discharge machining a circular hole in a workpiece, said electrode comprising:

an electrically conductive body having a leading end, a length with a substantially non-circular outer shape in cross-section with at least one dielectric supply bore formed lengthwise through said body, said at least one bore connecting a dielectric exit at said leading end and a dielectric entrance distal therefrom, wherein said non-circular outer shape is operatively adapted to provide a dielectric flush path between said body and the hole being machined in the workpiece through which a dielectric fluid can more readily flow.

2. The electrode as set forth in claim 1, wherein said non-circular outer shape of said body is operatively adapted to provide a substantial increase in flush path cross-sectional area between said body and the hole being machined in the workpiece.

3. The electrode as set forth in claim 1, wherein said non-circular outer shape of said body has a shape selected from the group consisting of rectangular, triangular, elliptical and fluted in shape.

4. The electrode as set forth in claim 3, wherein said shape is fluted and the fluted shape of said body is operatively adapted to increase the rate at which dielectric fluid flows through the flush path and out the hole, when said electrode is rotated.

5. The electrode as set forth in claim 1, wherein said at least one dielectric supply bore is a plurality of dielectric supply bores.

6. The electrode as set forth in claim 1, wherein said body has an interior surface forming one dielectric supply bore, an exterior surface and an insulation layer of electrically insulative material coated on said interior surface and said exterior surface, with said leading end being substantially free of an electrically insulative material.

7. The electrode as set forth in claim 6, wherein said electrically insulative material is a polymer.

8. An apparatus for electrical discharge machining a circular hole in a workpiece, said apparatus comprising:

a rotatable electrode comprising:
      an electrically conductive body having a leading end, a length of non-circular cross-section and at least one dielectric supply bore formed lengthwise through said body, said at least one bore connecting a dielectric exit at said leading end and a dielectric entrance distal therefrom, wherein said non-circular cross-section is operatively adapted to provide a dielectric flush path between said body and the hole being machined in the workpiece; and an electrical discharge machine operatively adapted for mounting and rotating said electrode, supplying a dielectric fluid to said dielectric entrance, and for conducting an electrical current through dielectric fluid disposed between the workpiece and the electrode.

9. The apparatus as set forth in claim 8, wherein the non-circular cross-section of said body is operatively adapted to provide a substantial increase in flush path cross-sectional area between said body and the hole being machined in the workpiece.

10. The apparatus as set forth in claim 8, wherein said body has an interior surface forming one dielectric supply bore, an exterior surface, and an insulation layer of electrically insulative material coated on said interior surface and said exterior surface, with said leading end being substantially free of an electrically insulative material.

11. A method for electrical discharge machining a circular hole in a workpiece, said method comprising the steps of:

providing a rotatable electrode comprising an electrically conductive body having a leading end, and a length of non-circular cross-section, with at least one dielectric supply bore formed lengthwise through the body, wherein the non-circular cross-section is operatively adapted to provide a dielectric flush path between the body and the hole being machined in the workpiece;

rotating the electrode;

supplying a dielectric fluid through the at least one dielectric supply bore of the electrode, out the leading end of the electrode and between the conductive body of the electrode and the workpiece;

conducting an electrical current through the dielectric fluid between the workpiece and the electrode; and disposing the electrode and the workpiece proximal to each other.

12. The method as set forth in claim 11, wherein said method further comprises the step of electrical discharge machining a blind hole in the workpiece.

13. The method as set forth in claim 11, wherein said method further comprises the step of electrical discharge machining a through hole in the workpiece.

14. The method as set forth in claim 11, wherein the electrode being provided has one dielectric supply bore formed lengthwise through the center of the body and said method further comprises the step of forming a core of workpiece material, disposed in the one dielectric supply bore, during the machining of a circular hole in the workpiece.

15. The method as set forth in claim 14, wherein the body of the electrode being provided has an interior surface forming the one dielectric supply bore, an exterior surface, and an insulation layer of electrically insulative material coated on the interior surface and the exterior surface, with the leading end being substantially free of an electrically insulative material.

* * * * *